W. A. BUTLER.

Water-Trap.

Reissued Sept. 28, 1875.

No. 6,665.

Witnesses
John Becker
Fred. Haynes

Wm A Butler
by his Attorneys
Brown & Allen

N. PETERS, PHOTO-LITHOGRAPHER, WASHINGTON, D. C.

UNITED STATES PATENT OFFICE.

WILLIAM A. BUTLER, OF NEW YORK, N. Y.

IMPROVEMENT IN WATER-TRAPS.

Specification forming part of Letters Patent No. 165,302, dated July 6, 1875; reissue No. 6,665, dated September 28, 1875; application filed August 30, 1875.

DIVISION B.

*To all whom it may concern:*

Be it known that I, WILLIAM A. BUTLER, of New York, in the county and State of New York, have invented a new and useful Improvement in Water-Traps; and I do hereby declare that the following is a full, clear, and exact description of the same, reference being had to the accompanying drawing, which forms part of this specification.

This invention relates to water-traps composed of two longitudinal half-trap sections united together. The invention consists in such a trap made of sheet metal, and of novel construction, as regards its longitudinal joint or seam, whereby a stronger and more durable trap may be produced at less cost. The trap may be of any desired shape, and is made of two similar portions or halves of sheet metal, with corresponding external flanges running lengthwise of the trap, and which are united by soldering or burning them together.

The longitudinal half-trap sections of which said trap is composed may be produced by stamping or otherwise, and with their corresponding flanges of a flat construction. These flanges, when the two half trap sections are placed together, with the faces of the flanges in contact, may either be united by soldering or by burning them together by the aid of a blow-pipe, without the use of solder. The joint made in this way forms a stiffening-rib, and gives great strength to the trap, which adds to its durability, likewise economizes its construction. These advantages will be apparent when it is considered that, in the ordinary construction of soft-metal traps made in longitudinal half-trap sections, the meeting longitudinal edges of the latter are chamfered off to form grooves, in which the solder is poured or melted, leaving no stiffening-rib on the exterior, and consuming a large amount of solder.

The accompanying drawing represents one form of my improved trap, the seam of which is here shown as extending directly along the trap, and from front to back, in a plane centrally intersecting the trap; but this special arrangement of the seam forms no part of the present invention.

Figure 1:
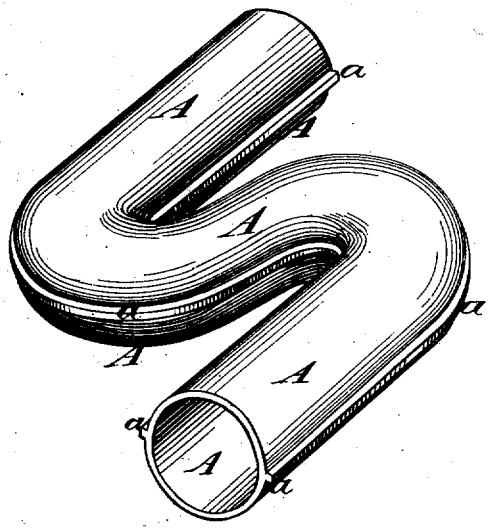
Figure 2:
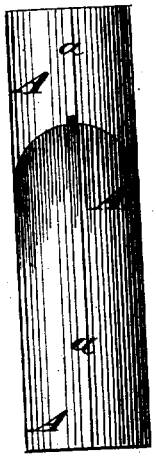
Figure 3:
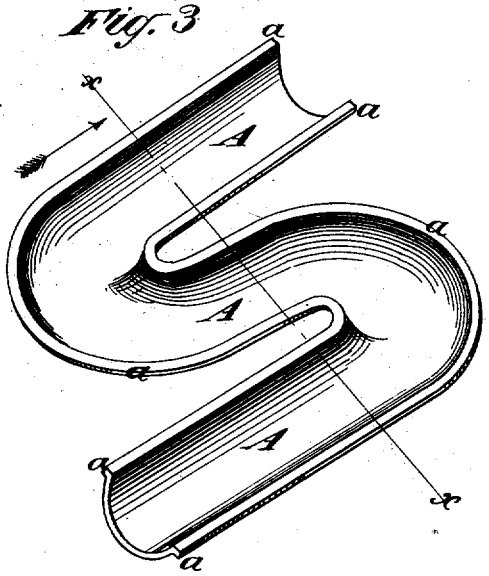
Figure 4:
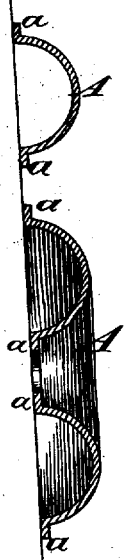

Figure 1 is a perspective view of such a trap; Fig. 2, a front view of the same, showing the straight central seam; Fig. 3, a perspective view of one of the two halves, or similar pieces, of which said trap is composed; and Fig. 4, a transverse section of the same, on the line *x x*.

A A are the two similar portions or halves of the trap. These similar portions or half-trap sections are made of sheet metal, with corresponding external flanges *a a*, which are flat or plain on their faces, arranged to run lengthwise of the trap, and so that when the two halves of the trap are placed together, with the faces of the flanges in contact, they may be readily united, either by soldering or by "burning" them together by the aid of a blow-pipe, and without the use of solder, the same leaving a rib at the joint, which serves to materially stiffen the trap.

I claim—

A water-trap made of two similar portions or longitudinal half-trap sections of sheet metal, with corresponding external flanges running lengthwise of the trap, and which are united by soldering or burning them together, substantially as specified.

WM. A. BUTLER.

Witnesses:

BENJAMIN W. HOFFMAN,
FRED. HAYNES.